(12) United States Patent
Baek

(10) Patent No.: US 8,910,047 B2
(45) Date of Patent: Dec. 9, 2014

(54) DEVICE-SPECIFIC AND APPLICATION-SPECIFIC COMPUTING DEVICE, PLAYBACK DEVICE AND METHOD FOR CONTROLLING PLAYBACK DEVICE USING COMPUTING DEVICE

(75) Inventor: Wonjang Baek, Seongnam-si (KR)

(73) Assignee: SK Planet Co., Ltd., Seoul (KR)

( * ) Notice: Subject to any disclaimer, the term of this patent is extended or adjusted under 35 U.S.C. 154(b) by 34 days.

(21) Appl. No.: 12/824,941

(22) Filed: Jun. 28, 2010

(65) Prior Publication Data

US 2010/0329087 A1   Dec. 30, 2010

(30) Foreign Application Priority Data

Jun. 30, 2009   (KR) ................ 10-2009-0059209

(51) Int. Cl.
| | | |
|---|---|---|
| G06F 3/00 | (2006.01) | |
| G11B 7/085 | (2006.01) | |
| G11B 27/34 | (2006.01) | |
| G11B 19/02 | (2006.01) | |
| G11B 27/10 | (2006.01) | |

(52) U.S. Cl.
CPC .............. *G11B 27/34* (2013.01); *G11B 19/027* (2013.01); *G11B 27/105* (2013.01); *G11B 2220/2541* (2013.01)
USPC ............... 715/727; 715/740; 725/78; 725/82; 341/176; 369/30.26

(58) Field of Classification Search
USPC .................................. 715/727, 740; 341/176
See application file for complete search history.

(56) References Cited

U.S. PATENT DOCUMENTS

| | | | | |
|---|---|---|---|---|
| 6,437,836 | B1* | 8/2002 | Huang et al. ................ | 348/734 |
| 6,981,217 | B1* | 12/2005 | Knauft et al. ............... | 715/210 |
| 7,870,496 | B1* | 1/2011 | Sherwani ..................... | 715/761 |
| 8,312,297 | B2* | 11/2012 | Sato et al. ................... | 713/194 |
| 8,813,138 | B2* | 8/2014 | Warrick et al. ............... | 725/78 |
| 2002/0190956 | A1* | 12/2002 | Klein et al. ................. | 345/169 |
| 2005/0039133 | A1* | 2/2005 | Wells et al. ................. | 715/740 |
| 2006/0187083 | A1* | 8/2006 | Lee et al. ................. | 340/825.69 |
| 2006/0212136 | A1* | 9/2006 | Lee et al. ..................... | 700/19 |
| 2007/0176820 | A1* | 8/2007 | Vidal ........................... | 341/176 |
| 2007/0223876 | A1* | 9/2007 | Hashimoto et al. .......... | 386/95 |
| 2007/0296552 | A1* | 12/2007 | Huang et al. ................ | 340/10.5 |

(Continued)

FOREIGN PATENT DOCUMENTS

| | | | |
|---|---|---|---|
| KR | 10-2006-0099989 A | 9/2006 | |
| KR | 20060099989 | * 9/2006 | ............... H04Q 9/00 |

OTHER PUBLICATIONS

News.cnet.com "Java to appear in next-gen DVD players", Jun. 28, 2005, pp. 1-4 http://news.cnet.com/Java-to-appear-in-next-gen-DVD-players/2100-1046_3-5766409.html.*

Unify4life, Control Anything With Your Cell phone, Jan. 10, 2009, pp. 1-3 http://www.popsci.com/gear-amp-gadgets/article/2009-01/control-anything-your-cell-phone.*

(Continued)

*Primary Examiner* — Stephen Hong
*Assistant Examiner* — Mario M Velez-Lopez
(74) *Attorney, Agent, or Firm* — Stein IP, LLC

(57) ABSTRACT

A device-specific and application-specific computing device, a playback device and a method for controlling the playback device using the computing device is disclosed. In accordance with the present invention, a user may control the playback device using a control information generated according to a device configuration information of the computing device in his/her possession.

4 Claims, 3 Drawing Sheets

(56) References Cited

U.S. PATENT DOCUMENTS

| | | | |
|---|---|---|---|
| 2009/0113478 A1* | 4/2009 | Haughawout et al. | 725/40 |
| 2009/0156251 A1* | 6/2009 | Cannistraro et al. | 455/557 |
| 2009/0239587 A1* | 9/2009 | Negron et al. | 455/566 |
| 2009/0262084 A1* | 10/2009 | Yu | 345/173 |
| 2009/0303186 A1* | 12/2009 | Prestenback et al. | 345/168 |
| 2010/0169790 A1* | 7/2010 | Vaughan et al. | 715/740 |
| 2010/0277337 A1* | 11/2010 | Brodersen et al. | 340/825.22 |
| 2011/0032191 A1* | 2/2011 | Cooke et al. | 345/173 |
| 2012/0133841 A1* | 5/2012 | Vanderhoff et al. | 348/734 |

OTHER PUBLICATIONS

Unify4life, Control Anything With Your Cell phone, Jan. 10, 2009, pp. 1-3 http://www.popsci.com/gear-amp-gadgets/article/2009-01/control-anything-your-cell-phone.*

News.cnet.com "Java to appear in next-gen DVD players", Jun. 28, 2005, pp. 1-4 http://news.cnet.com/Java-to-appear-in-next-gen-DVD-players/2100-1046 3-5766409.html.*

First Office Action dated Dec. 6, 2010, issued by Korean Patent Office in corresponding application KR10-2009-0059209.

International Search Report dated Mar. 31, 2011, issued by WIPO in corresponding application PCT/KR2010/004195.

* cited by examiner

12 # DEVICE-SPECIFIC AND APPLICATION-SPECIFIC COMPUTING DEVICE, PLAYBACK DEVICE AND METHOD FOR CONTROLLING PLAYBACK DEVICE USING COMPUTING DEVICE

This application claims the benefit of Korean Patent Application No. 10-2009-0059209 filed on Jun. 30, 2009, which is hereby incorporated for reference.

BACKGROUND OF THE INVENTION

1. Field of the Invention

The present invention relates to a device-specific and application-specific computing device, a playback device and a method for controlling the playback device using the computing device, and more particularly to a device-specific and application-specific computing device, a playback device and a method for controlling the playback device using the computing device wherein the playback device is controlled using a control information thereof generated according to a device configuration information of the computing device.

2. Description of the Related Art

Playback devices such as a DVD player and a Blu-ray disk player may be controlled via a RF (Radio Frequency) remote controller or an IR (InfraRed) remote controller.

Generally, a separate remote controller is required for each playback device. Moreover, a user must learn how to use each remote controller. Therefore, it is difficult for the user to learn how to use the remote controllers as the number of the remote controller increases.

In order to overcome the disadvantage, a universal remote controller capable of controlling multiple playback devices was proposed. The user can control one of the multiple playback devices by selecting a code from multiple codes for multiple remote controller.

However, the number of codes that can be stored in the universal remote controller is limited, and the universal remote controller is highly priced. Moreover, the universal remote controller is not capable of supporting latest playback devices.

SUMMARY OF THE INVENTION

It is an object of the present invention to provide a device-specific and application-specific computing device, a playback device and a method for controlling the playback device using the computing device wherein the playback device is controlled using a control information thereof generated according to a device configuration information of the computing device.

In order to achieve above-described object of the present invention, there is provided a computing device comprising a display means, an input means for receiving a user input, a program, a processor for executing the program, a memory for storing the program and a communication means for communicating with a playback device, wherein the program comprises: a first instruction for receiving an device configuration information by controlling the communication means; a second instruction for displaying on the display means a screen obtained by interpreting the device configuration information; a third instruction for receiving the user input, wherein the user refers to the screen and generates the user input by manipulating the input means; a fourth instruction for generating a control information for controlling the playback device based on the user input; and a fifth instruction for transmitting the control information to the playback device by controlling the communication means.

Preferably, the input means comprises at least one of a keyboard, a keypad, a touchpad and a touch screen.

Preferably, the device configuration information comprises: a GUI (Graphical User Interface) information for configuring a GUI of the screen; and, a key-map information including an information on a key displayed in the GUI.

Preferably, the user input comprises one of a click, a double click, a vertical screen scrolling, a horizontal screen scrolling, a touch input, a multi-point touch input and combinations thereof.

Preferably, the fourth instruction comprises a sub-instruction for generating a screen mapping information for mapping the screen to a display device connected to the playback device and the control information including a key input information included in the user input.

In order to achieve above-described another object of the present invention, there is provided a playback device comprising a program, a processor for executing the program, a memory for storing the program and a communication means for communicating with a computing device, wherein the program comprises: a first instruction for receiving, from the computing device via the communication means, a control information generated based on a user input, wherein a user refers a screen generated based on a device configuration information and generates the user input by manipulating an input means; and a second instruction for controlling playback device according to the control information.

Preferably, the program in accordance with the present invention may further comprise a third instruction for transmitting the device configuration information to the computing device.

Preferably, the device configuration information comprise: a GUI information for configuring a GUI of the screen, and a key-map information for including an information on a key displayed in the GUI.

Preferably, the user input comprises one of a click, a double click, a vertical screen scrolling, a horizontal screen scrolling, a touch input, a multi-point touch input and a combinations thereof.

Preferably, the control information includes a screen mapping information for mapping the screen to a display device connected to the playback device and a key input information included in the user input.

Preferably, the playback device supports a BD-J (Blu-ray Disc Java) specification. In order to achieve above-described yet another object of the present invention, there is provided a method for controlling a playback device using a computing device, the method comprising: (a) transmitting a device configuration information to the computing device; (b) generating a screen displayed on a display means of the computing device by interpreting the device configuration information; (c) receiving a user input, wherein the user refers to the screen of the computing device and generates the user input by manipulating an input means of the computing device; (d) generating the control information for controlling the playback device based on the user input; and (e) transmitting the control information to the playback device from the computing device.

Preferably, the input means comprises at least one of a keyboard, a keypad, a touchpad and a touch screen.

Preferably, the device configuration information comprises: a GUI information for configuring a GUI of the screen, and a key-map information for including a information on a key displayed in the GUI.

Preferably, the user input comprises one of a click, a double click, a vertical screen scrolling, a horizontal screen scrolling, a touch input, a multi-point touch input and combinations thereof.

Preferably, the control information comprises a screen mapping information for mapping the screen to a display device connected to the playback device and a key input information included in the user input.

Preferably, the method in accordance with the present invention may further comprise (f) controlling the playback device according to the control information.

DETAILED DESCRIPTION OF THE INVENTION

A device-specific and application-specific computing device, a playback device and a method for controlling the playback device using the computing device in accordance with the present invention will be described in detail with reference to accompanied drawings.

Figure 1:
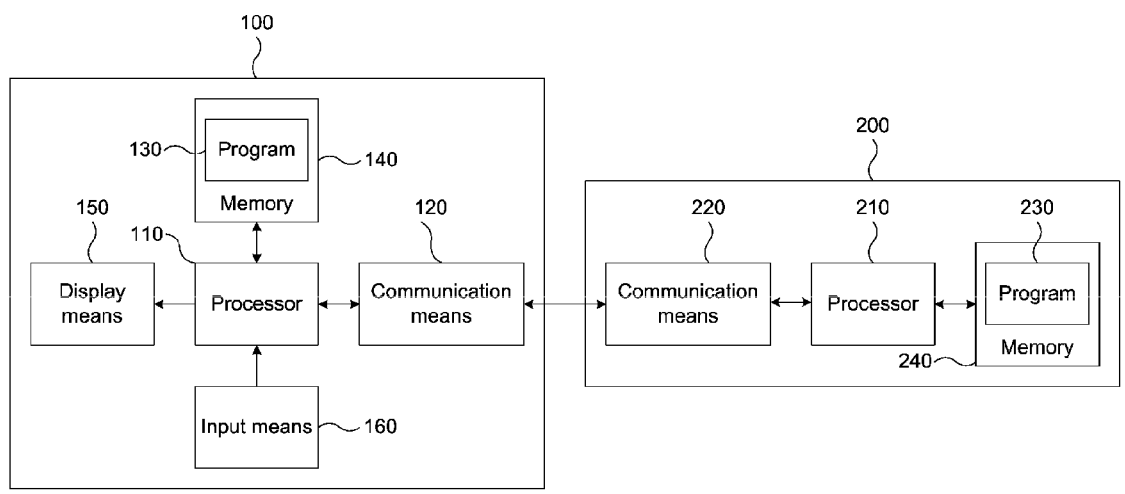
FIG. 1 is a block diagram illustrating a computing device and a playback device in accordance with the present invention.

FIG. 1 is a block diagram illustrating a computing device and a playback device in accordance with the present invention.

Referring to FIG. 1, the computing device 100 in accordance with the present invention comprises a display means 150, an input means 160, a program 130, a processor 110, a memory 140 and a communication means 120. In addition, the playback device 200 in accordance with the present invention comprises a program 230, a processor 210, a memory 240 and a communication means 220. Preferably, the playback device 200 supports a BD-J specification.

The computing device 100 in accordance with the present invention is described hereinafter in more detail.

The computing device 100 may be, but is not limited to, a mobile communication terminal, a PMP (Portable Media Player) and a PDA (personal digital assistant).

The display means 150 outputs a screen according to a control of the processor 110. Preferable, the display means 150 may include various displays such as LCD (Liquid Crystal Display) and OLED (Organic Light-Emitting Diode).

The input means 160 receives a user input. The input means 160 may include at least one of a keyboard, a keypad, a touchpad and a touch screen.

The processor 110 executes the program 130 and controls components such as the memory 140, the communication means 120 and the display means 150 included in the computing device 100.

The memory 140 stores the program 130 and provides a resource required by the processor 110 when the program 130 is executed. The memory 140 may include various memory elements such as a SDRAM (Synchronous dynamic random access memory), a EEPROM (Electrically Erasable Programmable Read-Only Memory) and a Non-volatile memory.

The communication means 120 communicates with the playback device 200 according to the control of the processor 110. The communication means 120 receives a device configuration information from the playback device 200 and transmits a control information to the playback device 200. The communication means 120 may support, but is not limited to, WLAN (wireless local area network), Bluetooth, Infrared communication and RF (Radio Frequency) communication.

Figure 2:
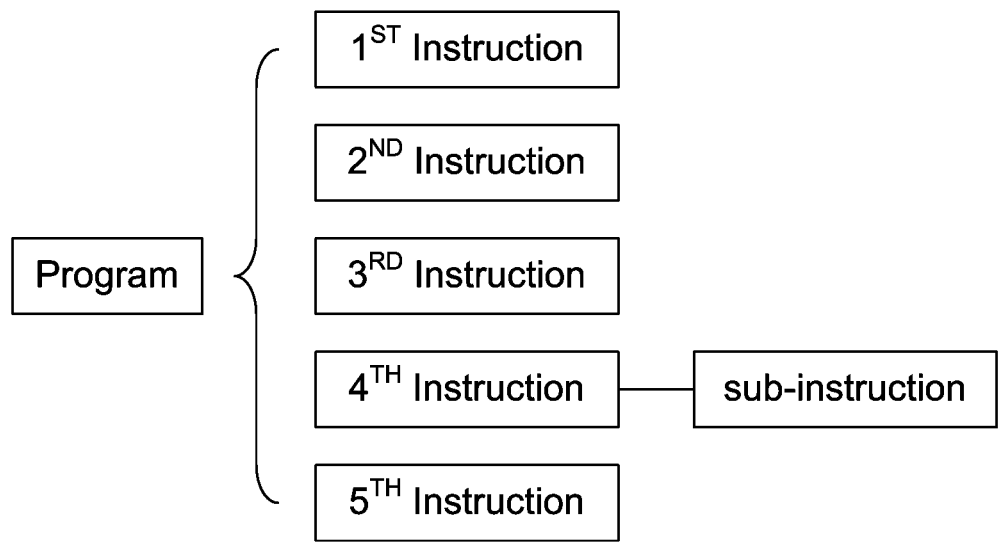
FIG. 2 is a block diagram illustrating a program included in a computing device in accordance with the present invention.

As shown in FIG. 2, the program 130 includes a first instruction through a fifth instruction. The processor 110 executes the first instruction through the fifth instruction included in the program to control the playback device 200

When the first instruction is executed by the processor 110, the communication means 120 receives the device configuration information according to the control of the processor 110. The device configuration information may be received from the playback device 200 or received from a separate server via network.

The device configuration information includes a GUI (Graphical User Interface) information for configuring a GUI of the screen and a key-map information including an information on keys displayed in the GUI.

Specifically, the GUI information includes informations associated with vertical scrollbars, horizontal scrollbars and icons included in the GUI displayed on the display means 150. For instance, when a remote controller of the playback device 200 is displayed graphically on the display means 150, the GUI information may include informations associated with the icon representing buttons of the remote controller.

The key-map information includes informations associated with buttons and/or keys corresponding to the vertical scrollbar, the horizontal scrollbar or the icon. For instance, when a user clicks one of the icons representing buttons of the remote controller displayed on the display means 150, the button of the graphical remote controller corresponding to the clicked icon is selected according to the key-map information.

Moreover, the device configuration information may include an information necessary for controlling a hardware included in the playback device 200 or an information necessary for controlling an application being executed in the playback device 200.

For instance, in case of playing a blu-ray disk inserted in the playback device, the device configuration information may include the GUI information and the key-map information corresponding to a "PLAY" button, a "STOP" button, a "FF" (Fast Forward) button and a "REW" (REWind) button required to play video/audio data stored in the blu-ray disk. In addition, in case of executing a JAVA application such as an e-mail application in the playback device, the device configuration information may include the GUI information and the key-map information necessary for controlling the e-mail application. In this case, the device configuration information may be application-specific for the e-mail application being executed.

The processor 110 displays, on the display means 150, the screen obtained by interpreting the device configuration information according to the second instruction. The screen is configured to include the vertical scrollbars, the horizontal scrollbars and/or the icons according to the GUI information included in the device configuration information.

When the user refers to the screen and generates the user input by manipulating the input means 160, the processor 110 receives the user input from the input means 160 according to the third instruction. For instance, the user input may include, but is not limited to, one of a click, a double click, a vertical screen scrolling, a horizontal screen scrolling, a touch input, a multi-point touch input and combinations thereof.

The processor 110 generates the control information for controlling the playback device 200 based on the user input according to the fourth instruction. Preferably, the processor 110 may generate the control information according to a sub-instruction included in the fourth instruction.

In one embodiment, when the user clicks a "PLAY" icon displayed on the display means 150, the processor 110 generates the control information by extracting a key input information corresponding to the "PLAY" icon from the key-map information. In another embodiment, when the user clicks the vertical scrollbar displayed on the display means 150, the processor 110 generates the control information including the key input information corresponding to the vertical scrollbar which extracted from the key-map information and a screen mapping information for mapping a scroll of the screen according to the clicking of the vertical scrollbar to a display device connected to the playback device.

The processor 110 transmits the control information to the playback device 200 by controlling the communication means 120 according to the fifth instruction.

The playback device 200 in accordance with the present invention is described hereinafter in more detail.

The playback device 200 may be, but is not limited to, a Blu-ray player supporting the BD-J specification, a video game console, a personal computer and a set-top box.

The processor 210 executes the program 230 and controls components such as the memory 240 and the communication means 220 included in the playback device 200.

The memory 240 stores the program 230 and provides a resource necessary for the processor 210 to execute the program 230. The memory 240 may include various memory elements such as the SDRAM, the EEPROM and the Non-volatile memory.

The communication means 220 communicates with the computing device 100 according to the control of the processor 210. The communication means 220 transmits the device configuration information to the computing device 100 and receives the control information from the computing device 100. The communication means 220 may support, but is not limited to, WLAN, Bluetooth, Infrared communication and RF communication.

Figure 3:
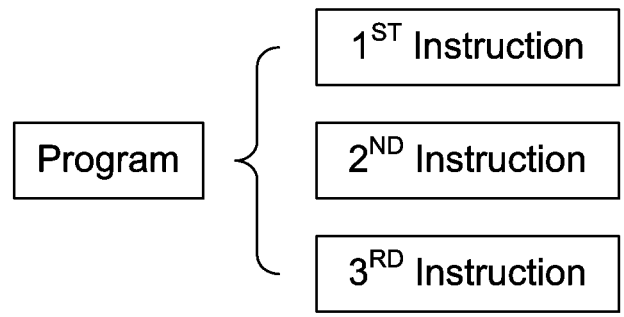
FIG. 3 is a block diagram illustrating a program included in a playback device in accordance with the present invention.

As shown in FIG. 3, the program 230 includes a first instruction through a third instruction. The processor 210 executes the first instruction though the third instruction included in the program 230.

The processor 210 transmits the device configuration information for generating the screen displayed on the display means 150 of the computing device 100 to the computing device 100 via the communication means 220 according to the first instruction. When the computing device 100 receives the device configuration information from the separate server via the network, the program 230 may not include the first instruction.

The processor 210 receives the control information from the computing device 100 via the communication means 220 according to the second instruction. The control information is generated based on the user input. The user refers the screen displayed on the display means 150 and generates the user input by manipulating the input means 160.

The processor 210 controls the playback device 200 by interpreting the control information according to the third instruction.

In one embodiment, when the control information includes the key input information corresponding to the "PLAY" icon, the processor 210 controls the playback device 200 to play video/audio data. In another embodiment, when the control information includes the key input information corresponding to the vertical scrollbar from the key-map information and the screen mapping information for mapping a scroll of the screen according to the clicking of the vertical scrollbar to a display device connected to the playback device, the processor 210 makes the screen displayed on the display device connected to the playback device move up and down.

Figure 4:
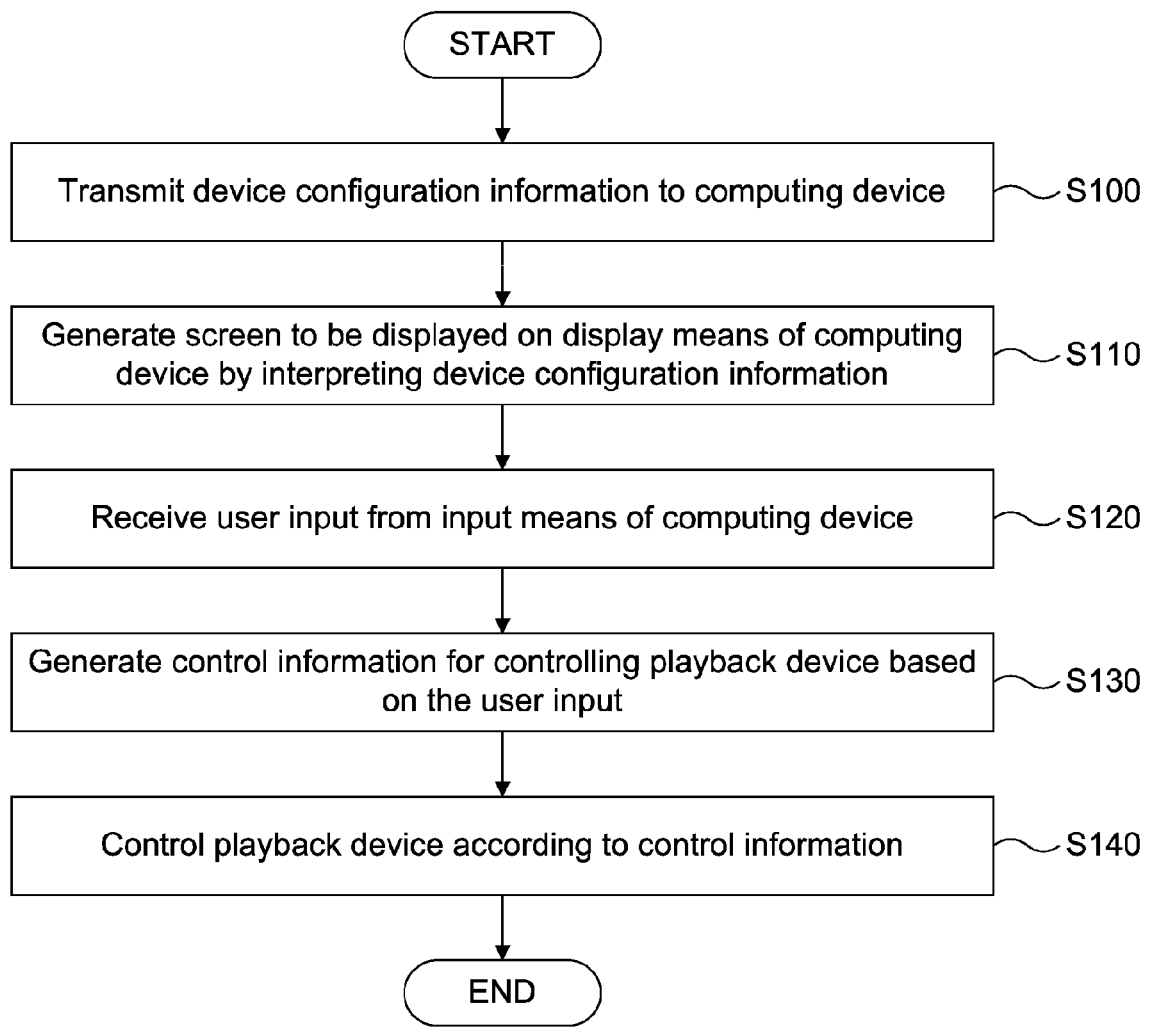
FIG. 4 is a flow diagram illustrating a method for controlling a playback device using a computing device in accordance with the present invention.

FIG. 4 is a flow diagram illustrating a method for controlling a playback device using a computing device in accordance with the present invention.

Referring to FIG. 4, the playback device transmits a device configuration information to the computing device (S100). The device configuration information may include a GUI information for configuring a GUI of a screen and a key-map information including an information on keys displayed in the GUI.

The device configuration information may be transmitted to the computing device from the playback device. In addition, the device configuration information may be transmitted from a separate server to the computing device via network.

The device configuration information may be an information necessary for controlling a hardware included in the playback device or an information necessary for controlling an application being executed in the playback device.

For instance, the device configuration information may include the GUI information and the key-map information corresponding to a "PLAY" button, a "STOP" button, a "FF" button and a "REW" button required to play video/audio data stored in a blu-ray disk inserted in the playback device. In this case, the device configuration information may be transmitted from the playback device to the computing device. In addition, the device configuration information may include the GUI information and the key-map information necessary for controlling a JAVA application such as an e-mail application executed in the playback device. In this case, the device configuration information may be transmitted from the playback device to the computing device or from the separate server to the computing device via a network.

Thereafter, the computing device generates the screen displayed on the display means of the computing device obtained by interpreting the device configuration information (S110).

Thereafter, the user input is received from the computing device (S120). The user refers the screen and generates the user input by manipulating the input means.

The input means may include at least one of a keyboard, a keypad, a touchpad and a touch screen. Moreover, the user input may include, but is not limited to, one of a click, a double click, a vertical screen scrolling, a horizontal screen scrolling, a touch input, a multi-point touch input and combinations thereof.

Thereafter, the computing device generates the control information for controlling the playback device based on the user input (S130). In one embodiment, when the user clicks a "PLAY" icon displayed on the display means of the computing device, a processor thereof generates the control information by extracting a key input information corresponding to the "PLAY" icon from the key-map information. In another embodiment, when the user clicks the vertical scrollbar displayed on the display means of the computing device, the processor thereof generates the control information including the key input information corresponding to the vertical scrollbar extracted from the key-map information and a screen mapping information for mapping a scroll of the screen according to the clicking of the vertical scrollbar to the display device connected to the playback device.

Thereafter, the control information is transmitted from the computing device to the playback device (S140).

Thereafter, the playback device is controlled according to the control information (S150).

In one embodiment, when the control information includes the key input information corresponding to the "PLAY" icon, a processor of the playback device controls the playback device to play video/audio data. In another embodiment, when the control information includes the key input information corresponding to the vertical scrollbar from the key-map information and the screen mapping information for mapping a scroll of the screen according to the clicking of the vertical scrollbar to a display device connected to the playback device, the processor of the playback device makes the screen displayed on the display device connected to the playback device move up and down.

As described above, a device-specific and application-specific computing device, a playback device and a method for controlling the playback device using the computing device in accordance with the present invention provides following advantages.

The user may easily control the playback device by referring the screen displayed on the display means of the computing means. In addition, since the user controls the playback device using the computing device in his/her possession, the user does not need the universal remote controller.

Moreover, the manufacturer of the playback device may provide to the user the device configuration information associated therewith, to reduce the cost for manufacturing the remote controller of the playback device.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A computing device which communicates with a playback device according to user input, the computing device comprising:
   a display;
   an input device which receives the user input;
   a memory which stores a program;
   a communication interface which communicates with the playback device and a separate server via network; and
   a processor which executes the stored program to generate control information for controlling the playback device,
   wherein the program comprises:
   a first instruction executed by the processor to control the communication interface to receive first device configuration information from the playback device and to receive second device configuration information from the separate server, the first device configuration information being necessary for controlling a hardware included in the playback device, the second device configuration information being necessary for controlling an application being executed in the playback device, each of the received first and second device configuration information comprising interface information used to generate a screen and the control information for controlling functions of the playback device, the interface information comprising a Graphical User Interface (GUI) information which configures a GUI of the screen, the GUI information comprising at least one icon and at least one scrollbar;
   a second instruction executed by the processor to display the screen on the display according to the interface information;
   a third instruction executed by the processor to receive the user input received from the input device to select one of the functions according to the displayed screen;
   a fourth instruction executed by the processor to use the received user input to generate the control information for the selected function for controlling the playback device, the fourth instruction comprising a sub-instruction for generating screen mapping information for mapping the screen to a display device connected to the playback device; and
   a fifth instruction executed by the processor to control the communication interface to transmit the generated control information to the playback device,
   wherein the interface information further comprises a key-map information including information on each icon displayed in the GUI, each icon corresponding to one of the functions of the control information,
   wherein the first and second device configuration information includes the GUI information and the key-map information necessary for controlling a JAVA application being executed in the playback device,
   wherein the key-map information corresponds to a PLAY icon, a STOP icon, a FF icon and a REW icon, which are provided to play video/audio data stored in a blu-ray disk inserted in the playback device,
   wherein when the PLAY icon displayed on the display of the computing device is clicked by the user input, the processor of the computing device generates the control information by extracting a key input information corresponding to the PLAY icon from the key-map information,
   wherein when the at least one scrollbar displayed on the display of the computing device is clicked by the user input, the processor of the computing device generates the control information including the key input information corresponding to the at least one scrollbar extracted from the key-map information and a screen mapping information for mapping a scroll of the screen according to the clicking of the at least one scrollbar to a display device connected to the playback device,
   wherein the first device configuration information is also received from the separate server, and when the first and second device configuration information are received from the separate server via the network, the processor of the computing device does not execute the first instruction.

2. The computing device in accordance with claim 1, wherein the input device comprises a keyboard, a keypad, a touchpad, and/or a touch screen.

3. The computing device in accordance with claim 1, wherein the user input comprises one of a click, a double click, a vertical screen scrolling, a horizontal screen scrolling, a touch input, a multi-point touch input and combinations thereof.

4. The computing device in accordance with claim 1, wherein the first and second device configuration information includes application-specific information necessary for controlling an application being executed in the playback device.

* * * * *